United States Patent Office 2,986,563
Patented May 30, 1961

2,986,563
CERTAIN CYCL[3.2.2]AZINES

Virgil Carl Boekelheide, Rochester, N.Y., and Richard J. Windgassen, Jr., Allison Park, Pa., assignors, by direct and mesne assignments, to E. I. du Pont de Nemours and Company, Wilmington, Del., a corporation of Delaware No Drawing. Filed Mar. 16, 1959, Ser. No. 799,452

12 Claims. (Cl. 260—290)

This invention relates to a new class of heterocyclic compounds containing carbon and nitrogen in the rings.

Unsaturated polycyclic compounds which contain fused carbocyclic rings in which the unsaturation is fully conjugated form an interesting group of compounds which possess unusual and unexpected properties. These compounds, as a group, undergo many substitution reactions and are useful as intermediates in the preparation of other products. The compounds show, in contrast to open-chain fully conjugated polyolefins, unusual stability to heat and they are highly resistant to polymerization. Compounds such as azulene, pleidadiene, acepleiadiene and acepleiadylene are illustrative of fused ring carbocyclic compounds having fully conjugated unsaturation.

Very little is known about unsaturated heterocyclic compounds containing a plurality of fused rings in which the unsaturation is fully conjugated. In particular, substantially no information is available on heterocyclic compounds of this type which contain carbon and nitrogen as nuclear elements and in which three fused rings have a nitrogen atom in common. This class of compounds is unknown because no satisfactory method of preparing them has been available.

The compounds of the invention are represented generically by the following structure:

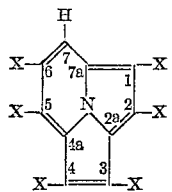

where the X's can be alike or different and are hydrogen or halogen (F, Cl, Br, I), hydrocarbyl, nitro (—NO$_2$), carbacyl [RC(O)—], carboxyl (—COOH) and groups hydrolyzable to carboxyl (acyl halides, esters, amides, anhydrides, salts and cyano). The nature and size of the R groups in the above substituents is not a critical feature of the invention. Preferably, for ease of preparation and purification of the compounds, the group R has at most 8 carbons. The substituents are illustrated more fully in a subsequent paragraph.

The numbers inside the fused rings are used to indicate the positions of the nuclear carbons in naming the compounds of the invention. It is to be noted that the carbons in the 1- and 4-positions and the carbons in the 2- and 3-positions are equivalent in view of the resonance of the double bonds.

The new compounds of the invention are referred to broadly as cyclazines [Boekelheide and Windgassen, J. Am. Chem. Soc. 80, 2020 (1958)]. The name, cyclazine, is applied to a conjugated cyclic compound held planar by three covalent bonds to an internal nitrogen atom. The various possible cyclazines which arise through having cycles (or rings) of different size or different points of attachment to nitrogen are distinguished by placing in brackets numerals which correspond to the number of atoms on the cycle between the points of fusion. In this system of nomenclature, the new compounds of the invention are cycl[3.2.2]azines.

The following examples illustrate the new compounds of the invention: cycl[3.2.2]azine, 2-methylcycl[3.2.2]azine, 2 - butylcycl[3.2.2]azine, 2 - tolylcycl[3.2.2]azine, 2,3-diethylcycl[3.2.2]azine, 2,3 - dihexylcycl[3.2.2]azine, 2-phenyl - 3 - octylcycl[3.2.2]azine, 2-naphthyl-3-phenylcycl[3.2.2]azine 1-propionylcycl[3.2.2]azine, 1-acetyl-4-butyrylcycl[3.2.2]azine, 1 - capryloylcycl[3.2.2]azine, 1-benzoylcycl[3.2.2]azine, 1,4 - dibenzoylcycl[3.2.2]azine, 1,4-dipropionyl-2,3-ditolylcycl[3.2.2]azine, 1,4-dibenzoyl-2,3 - diphenylcycl[3.2.2]azine, 1,2 - dicarboethoxycycl[3.2.2]azine, 1,2 - dicarbophenoxycycl[3.2.2]azine, 1,2-dicarbobutoxycycl[3.2.2]azine, 1,2 - dicarbooctyloxycycl[3.2.2]azine, 1,2 - dicarbamylcycl[3.2.2]azine, 1,2 - bis(ethylcarbamyl)cycl[3.2.2]azine, 1,2 - bis(dimethylcarbamyl)cycl[3.2.2]azine, 1,2 - bis(phenylcarbamyl)cycl[3.2.2]azine, 1-bromocycl[3.2.2]azine, 1,4-difluorocycl[3.2.2]azine, 1-chlorocycl[3.2.2]azine, 1,4-dichlorocycl[3.2.2]azine, 1-iodocycl[3.2.2]azine, 1-nitro-2,3-diphenylcycl[3.2.2]azine, 1 - nitro - 4 - acetylcycl[3.2.2]azine, 4-bromo-1-nitrocycl[3.2.2]azine, 1,2 - dicarboxycycl[3.2.2]-azine, and its ammonium and metal salts, e.g., sodium, barium, calcium, iron, nickel, tin, chromium, arsenic and titanium salts. Further examples which illustrate the compounds of the invention are: 1-cyanocycl[3.2.2]-azine, 1,4-dicyanocycl[3.2.2]azine, 1-cyano-2,3-diphenylcycl[3.2.2]azine, 5,6-dichlorocycl[3.2.2]azine, 1-nitro-5-methylcycl[3.2.2]azine, 5-ethylcycl[3.2.2]azine and 2,3-diphenyl-5-ethylcycl[3.2.2]azine. The above compounds are illustrative of the scope of the substituents which can be present on the cyclazine rings.

A preferred group of new compounds of the invention are those in which carbons in the 1-, 2-, 3- and 4-positions in the above formula are bonded to hydrogen, aliphatically saturated hydrocarbon groups of up to 10 carbons, halogens, nitro, carbacyl groups of up to 8 carbons and carboxyl groups or groups hydrolyzable to carboxyl; the carbons in the 5- and 6-positions are bonded to hydrogen, halogens or lower alkyl groups, and the carbon in the 7-position is unsubstituted, i.e., the carbon is bonded to hydrogen. These compounds are preferred because of availability of the reactants from which the compounds are obtained.

The features which are characteristic and distinctive for the compounds of the invention, as illustrated in the preceding paragraphs, are three unsaturated fused rings which have in the rings a total of 10 carbons and one nitrogen, the unsaturation being solely between carbons, the nitrogen being common to all three rings, one ring having 5 carbons, each of the other two rings having 4 carbons, the carbons being joined by fully conjugated double bonds.

The compounds are generally yellow crystalline solids in which the nitrogen common to the three fused rings is essentially neutral in character. The compounds possess excellent thermal stability and can be heated for prolonged periods without decomposition. The cycl[3.2.2]azines behave chemically as stable aromatic systems and, therefore, undergo substitution reactions smoothly. The hydrogens bonded to nuclear carbons can be readily replaced, e.g., with halogen, nitro, acetyl, alkyl, sulfo and cyano groups. The compounds of the invention are generally non-corrosive and can be stored in conventional containers under normal conditions.

The cycl[3.2.2]azines are synthesized from pyrrocolines, i.e., compounds which have the following structural formula in which the ring carbons may be bonded to hydrogen or monovalent substituents:

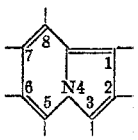

The numbers inside the ring indicate the positions of the nuclear carbons to which substituents, if present, are bonded.

Pyrrocoline, i.e., a compound of the above structure which has no substituents, and pyrrocoline derivatives having substituents in the 5-membered ring, can be prepared by methods which are described in the literature [see, for example, Borrows and Holland, Chem. Rev. 42, 611 (1948); Scholtz, Ber. 454, 734 (1912); Chichibabin, Ber. 60, 1607 (1927); Boekelheide and Feely, J. Org. Chem. 22, 589 (1957)].

Pyrrocolines in which the carbons in the 3- and 5-positions are bonded to hydrogen react readily with compounds having an acetylenic linkage to form cycl[3.2.2] azines. In this method of preparation the reactants, that is, the pyrrocoline, which may have substituents on the carbons in other than the 3- and 5-positions, and the acetylenic compound, are brought together in the presence of a dehydrogenation catalyst, for example, palladium-on-charcoal, and heated to a temperature sufficient to effect reaction. Acetylenic compounds which are preferred as reactants in this method of preparation are acetylenedicarboxylic acid and esters and amides of acetylenedicarboxylic acid. The reaction may, if desired, be conducted in a solvent which is not dehydrogenated under the conditions of the reaction. Aromatic hydrocarbons, for example, toluene or xylene, are suitable solvents for use in the process. This method of preparation is illustrated in the examples given later.

Pyrrocolines having the carbon in the 3-position bonded to hydrogen and the carbon in the 5-position bonded to methyl are particularly useful in the preparation of cycl[3.2.2]azines and form a preferred group of reactants. The methyl group in the 5-position is comparable in activity to the methyl group in α-picoline and 5-methylpyrrocolines can, therefore, be employed to prepare substituted and unsubstituted cycl[3.2.2]azines. The unsubstituted 5-methylpyrrocoline can be obtained by the method of Scholtz (see reference above) wherein 2,6-lutidine and acetic anhydride are reacted at an elevated temperature (about 215° C.) in a closed vessel under autogenous pressure. Monoacetyl and diacetyl substituted 5-methylpyrrocolines are obtained from which the acetyl groups are removed by conventional acid hydrolysis methods. The 5-methylpyrrocolines form derivatives with alkali metals, for example, lithium, sodium or potassium, which derivatives undergo further reaction with a compound having a carbonyl group, for example, an ester or an N,N-disubstituted amide. A cycl[3.2.2]azine intermediate is formed, as shown by the equation in column 4. In this step of the process a preferred reactant is an N,N-disubstituted amide of the general formula $$R_2NC(O)R'$$

where R is a short chain alkyl group, e.g., methyl or ethyl, and R' is hydrogen or a monovalent organic radical, preferably a hydrocarbon group of at most 12 carbons. The R groups do not appear in the cycl[3.2.2]azine and are, therefore, not critical. The R' group appears as a substituent in the cycl[3.2.2]azine on the carbon in the 2-position. For this reaction, therefore, an N,N-substituted amide is chosen in which R' is the group which is to be the substituent in the cycl[3.2.2]azine ring.

The reaction of a 5-methylpyrrocoline with a carbonyl compound, e.g., the disubstituted amides discussed above, is completed by a simple cyclization process wherein the intermediate product is heated with a ring-closing reagent, for example, glacial acetic acid, for a short period of time and the resulting cycl[3.2.2]azine is separated by conventional methods.

The process of preparing the compounds may be represented by the following schematic equation which is presented solely for the purpose of illustrating the broad steps in the process. Substituents, in addition to the methyl, can be present on the 5-methylpyrrocoline but are not shown for purposes of simplifying the structural formula. Such additional substituents, if present, will generally be carried through to the cyclazine compound.

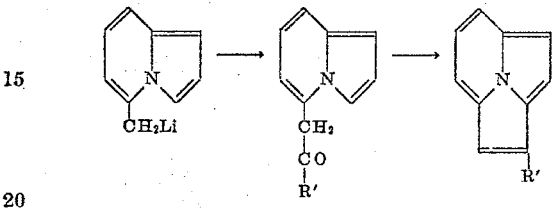

The above process for preparing the cycl[3.2.2]azines is described in a number of the examples which illustrate the invention.

As stated earlier, the cycl[3.2.2]azines undergo substitution reactions which are characteristic of carbocyclic aromatic compounds. Substitution reactions can therefore be employed to prepare cycl[3.2.2]azines having as substituents halogen (especially chlorine and bromine), sulfo, nitro, acetyl and other representative groups.

The preparation and properties of typical compounds of the invention are given in the following examples which are intended to be illustrative only and not limiting. In these examples, quantities of reactants are given as parts by weight.

EXAMPLE I

This example illustrates the preparation of an unsubstituted cycl[3.2.2]azine from 5-methylpyrrocoline.

An ether solution of n-butyllithium was prepared in a conventional manner by dissolving lithium metal in an ether solution of n-butyl bromide at about −15° C. using slightly less than 2 moles of lithium per mole of butyl bromide. The lithium derivative of 5-methylpyrrocoline was obtained in solution by treating 11.34 parts of 5-methylpyrrocoline with about 140 parts of an ether solution containing an equimolar quantity of n-butyllithium. The solution of 5-pyrrocolylmethyllithium was cooled to −30° C. under an atmosphere of nitrogen and a solution of 6.75 parts of dimethylformamide in about 35 parts of ether was added dropwise with stirring. The solution was allowed to warm to room temperature. It was stirred for one hour and 10.0 parts of glacial acetic acid was then added. The resulting solution was washed with water, placed in an addition funnel, and added slowly to a 3-neck flask (capacity, 500 parts of water) containing 315 parts of boiling acetic acid. A stream of nitrogen was passed through a gas bypass of the addition funnel to prevent the hot acetic acid vapors from reaching the tip of the addition funnel. During the addition ether was continuously removed from the boiling acetic acid solution by distillation. After addition of the ether solution had been completed, the acetic acid solution was cooled and diluted with 265 parts of benzene. Aqueous sodium bicarbonate solution was added to neutralize the acetic acid. The benzene solution was separated, dried and passed over alumina to remove intractable tars. The benzene was removed by evaporation and the dark residue was dissolved in n-pentane. This solution was chromatographed over acid-washed alumina. Elution with n-pentane gave a yellow solid which was sublimed to yield 2.8 parts of cycl[3.2.2]-azine. The compound, crystallized from methanol, formed yellow needles, M.P. 63.5–64.5° C. The ultraviolet (U.V.) absorption maxima (log ε) are: 419 (3.65); 408 (3.66); 398 (3.56); 289 (3.86); 274 (3.74); and 244 mμ (4.57).

*Analysis.*—Calc'd for $C_{10}H_7N$: C, 85.08; H, 5.00; N, 9.92. Found: C, 84.93; H, 5.30; N, 9.87.

The new compound of Example I forms an adduct with trinitrobenzene, as shown by the following example:

Equimolar quantities of cycl[3.2.2]azine and 1,3,5-trinitrobenzene were dissolved in the smallest volume of hot n-propanol necessary to effect solution. When the solution was cooled the equimolar complex of cycl[3.2.2]azine and 1,3,5-trinitrobenzene separated as orange needles, which were recrystallized from n-propanol and dried. The compound melted at 222–226° C. with decomposition.

*Analysis.*—Calc'd for $C_{10}H_7N \cdot C_6H_3N_3O_6$: C, 54.24; H, 2.85. Found: C, 53.92; H, 3.18.

EXAMPLE II

This example illustrates the preparation of a cycl-[3.2.2]azine having a hydrocarbon substituent.

A. A solution of 1.46 parts of N,N-dimethylbenzamide in about 10 parts of ether was added to an ether solution of the lithium derivative of 1.26 parts of 5-methylpyrrocoline, prepared as described in Example I, and cooled to −30° C. The reaction mixture was stirred for one hour at room temperature (about 25° C.) and a solution of 1.1 parts of glacial acetic acid in 15 parts of ether was added. The resulting ether solution was washed with water, dried and the ether removed under reduced pressure. The residue was crystallized from diisopropyl ether to give 0.8 part of 5-(ω-phenacyl)pyrrocoline, light yellow platelets, M.P. 109–110° C.

B. A solution containing 1 part of 5-(ω-phenacyl)-pyrrocoline in about 31.5 parts of glacial acetic acid was refluxed for 30 minutes and then neutralized with aqueous sodium bicarbonate solution. The solid which separated was collected and sublimed to yield 0.7 part of 2-phenylcycl[3.2.2]azine, a yellow solid, M.P. 93.5–94.5° C.

*Analysis.*—Calc'd for $C_{16}H_{11}N$: C, 88.45; H, 5.10. Found: C, 88.12; H, 5.27.

The trinitrobenzene adduct of the above compound was prepared by the process described in Example II. It was obtained as orange needles, M.P. 152.5–153.5° C.

*Analysis.*—Calc'd for $C_{22}H_{14}N_4O_6$: C, 61.40; H, 3.28. Found: C, 61.58; H, 3.57.

By selection of the appropriate N,N-dimethyl substituted amide, the procedure of Example II can be employed to prepare cycl[3.2.2]azines having a wide range of substituents in the 2-position. For example, the reaction of 5-methylpyrrocoline with N,N-dimethylbutyramide yields 2-propylcycl[3.2.2]azine; with N,N-dimethylcapryloylamide, 2-heptylcycl[3.2.2]azine is obtained; with N,N-dimethyl-p-toluylamide, 2-(p-tolyl)cycl[3.2.2]azine is obtained.

EXAMPLE III

This example illustrates the preparation of a cycl[3.2.2]azine bearing two hydrocarbon substituents.

A. A mixture of 95.5 parts of phenacyl bromide and 59.1 parts of 2,6-lutidine was heated for 48 hours at 50° C. The resulting hard crystalline mass was broken up and boiled with 75 parts of chloroform. The chloroform mixture was cooled, the crystalline material was separated by filtration and the crystals were washed with chloroform. There was obtained 95.1 parts of phenacyl-2,6-lutidinium bromide as slightly yellow crystals, M.P. 220° C. (dec.).

A solution of 95 parts of the above compound, 95 parts of sodium bicarbonate and 900 parts of water was heated for two hours at 100° C. An oil was obtained which solidified on cooling. Recrystallization of the solid from methanol gave 54.5 parts of 2-phenyl-5-methylpyrrocoline as white needles, M.P. 81–81.5° C.

*Analysis.*—Calc'd for $C_{15}H_{13}N$: C, 86.91; H, 6.32. Found: C, 87.16; H, 6.65.

B. An ether solution of the lithium salt of 5.0 parts of 2-phenyl-5-methylpyrrocoline was prepared by the process described in Example I. To this solution there was added a solution of 3.65 parts of N,N-dimethylbenzamide in about 16 parts of ether. The solution was stirred for 15 minutes, then cooled to −10° C. and 2.5 parts of glacial acetic acid was added. The ether solution was washed with water, dried and the ether was removed. The crystalline residue was dissolved in benzene and passed through a short alumina column. Removal of the benzene from the eluate left a crystalline solid from which there was obtained by crystallization from benzene and from cyclohexane 5.1 parts of 2-phenyl-5-(ω-phenacyl)pyrrocoline, M.P. 125–126° C.

*Analysis.*—Calc'd for $C_{22}H_{17}NO$: C, 84.86; H, 5.50. Found: C, 84.92; H, 5.83.

C. A solution containing 2.5 parts of 2-phenyl-5-(ω-phenacyl)pyrrocoline and 21 parts of glacial acetic acid was boiled under refluxing conditions for 1.5 hours. The solution was cooled, diluted with water and extracted with methylene chloride. The methylene chloride solution was washed with aqueous base, dried and concentrated. Recrystallization of the solid residue from benzene-cyclohexane gave 2.14 parts of 2,3-diphenylcycl[3.2.2]azine, a yellow crystalline solid, M.P. 141–141.5° C., ultraviolet absorption maxima (log ε): 420 (3.79); 321 (4.40); 260 (4.57); and 231 mμ (4.42).

*Analysis.*—Calc'd for $C_{22}H_{15}N$: C, 90.07; H, 5.15; N, 4.78; M.W., 293. Found: C, 90.09; H, 5.22; N, 4.79; M.W., 293.

The above compound, i.e., 2,3-diphenylcycl[3.2.2]azine, was also obtained by refluxing 0.35 part of 2-phenyl-5-(ω-phenacyl)pyrrocoline with 10.5 parts of glacial acetic acid for 1.5 hours. The compound, heated to 230° C., did not decompose, develop color or show a change in melting point. It was sublimed at 140° C./0.2 mm., leaving no residue.

A trinitrobenzene derivative of 2,3-diphenylcycl[3.2.2]azine was prepared by the procedure of Example I. The compound, after crystallization from n-propanol, was obtained as orange needles, M.P. 144–145° C.

*Analysis.*—Calc'd for $C_{28}H_{28}N_4O_6$: C, 66.40; H, 3.58. Found: C, 66.35; H, 3.69.

The procedure of Example III can be employed to prepare cycl[3.2.2]azines with a broad range of substituents by employing 5-methylpyrrocolines having the desired substituent in the 2-position and the appropriate N,N-dimethyl substituted amide. To illustrate, 2-butyl-3-propylcycl[3.2.2]azine is obtained from N,N-dimethylbutyramide and 2-butyl-5-methylpyrrocoline; 2-octyl-3-butylcycl[3.2.2]azine is obtained from 2-octyl-5-methylpyrrocoline and N,N-dimethylvaleramide; and 2-phenyl-3-(2-naphthyl)cycl[3.2.2]azine is obtained from 2-phenyl-5-methylpyrrocoline and N,N-dimethyl-2-naphthamide.

EXAMPLE IV

The following example illustrates the preparation of cycl[3.2.2]azines having acyl [RC(O)] substituents.

A solution of 0.1 part of acetic anhydride, 0.75 part of cycl[3.2.2]azine (Example I) and 10 parts of sym.-tetrachloroethane was prepared and cooled to 0° C. To this solution there was added 0.56 part of anhydrous stannic chloride. After this mixture had stood for 16 hours at room temperature, it was diluted with 14 parts of methylene chloride and stirred into a small amount of ice water. Sufficient hydrochloric acid was added to dissolve the tarry residue and the layer which contained the methylene chloride and sym.-tetrachloroethane was separated. This layer was washed with aqueous base, dried and chromatographed over acid-washed alumina. Elution with ether gave 0.03 part of 1-acetylcycl[3.2.2]azine, a yellow oil which was further purified by bulb-to-bulb distillation in vacuo, infrared (I.R.) absorption (carbonyl) at 6.05μ.

*Analysis.*—Calc'd for $C_{12}H_9NO$: C, 78.67; H, 4.95. Found: C, 78.64; H, 5.17.

Further elution with ether containing 5% of methanol gave 0.35 part of 1,4-diacetylcycl[3.2.2]azine, a yellow solid which was sublimed. The sublimate was recrystallized from ethanol and formed yellow needles, M.P. 183–184° C., ultraviolet absorption maxima (log ε): 420 (4.42); 410 (4.21) and 283 mμ (4.44); infrared absorption (carbonyl) at 6.08μ.

*Analysis.*—Calc'd for $C_{14}H_{11}NO_2$: C, 74.65; H, 4.92. Found: C, 74.93; H, 4.93.

The process of Example IV can be used to obtain cycl-[3.2.2]azines having a wide range of carbacyl groups in the 1,4-positions by proper choice of acid anhydrides. Thus, to obtain 1-propionylcycl[3.2.2]azine and 1,4-dipropionylcycl[3.2.2]azine, propionic anhydride is reacted with cycl[3.2.2]azine; to obtain 1-benzoyl and 1,4-dibenzoylcycl[3.2.2]azines, benzoic anhydride is employed.

EXAMPLE V

This example illustrates the preparation of a cycl[3.2.2]-azine having hydrocarbon and acyl substituents

[RC(O)—]

A. A reaction vessel was charged with 0.22 part of acetyl chloride, 0.3 part of 2,3-diphenylcycl[3.2.2]azine, 16 parts of sym.-tetrachloroethane and 0.5 part of anhydrous aluminum chloride. The mixture was heated one hour at 60° C. and allowed to stand for 24 hours at room temperature. It was diluted with 40 parts of methylene chloride and mixed with about 30 parts of 2 N hydrochloric acid to decompose the aluminum chloride. The methylene chloride solution was washed with dilute base, dried, concentrated to 20–25 parts and chromatographed over alumina. Elution with methylene chloride gave 0.1 part of the starting azine. Elution of the strongly-held yellow band at the top of the column with methylene chloride containing 57% of methanol gave 0.22 part of 1,4-diacetyl-2,3-diphenylcycl[3.2.2]azine, a yellow solid which, after recrystallization from benzenecyclohexane solution, melted at 189–190° C. The compound showed carbonyl absorption in the infrared at 6.13μ.

*Analysis.*—Calc'd for $C_{26}H_{19}NO_2$: C, 82.74; H, 5.07. Found: C, 82.47; H, 5.18.

B. A reaction vessel was charged with 0.25 part of 2,3-diphenylcycl[3.2.2]azine, 0.21 part of acetic anhydride and 16 parts of sym.-tetrachloroethane. To this solution, there was added 1.1 parts of anhydrous stannic chloride and the mixture was allowed to stand for 24 hours at room temperature. Work-up of this mixture by a procedure similar to the one described in part A gave 0.25 part of 1,4-diacetyl-2,3-diphenylcycl[3.2.2]azine. There was also recovered 0.04 part of the initial cyclazine.

The process of Example V is essentially an extension of the process of Example IV and it can be applied to the preparation of cycl[3.2.2]azines having a wide range of substituents in the 1,4- and 2,3-positions by proper selection of the starting cycl[3.2.2]azine and the acid anhydride. To illustrate, 1,4-dipropionyl-2,3-dimethylcycl-[3.2.2]azine is prepared from 2,3-dimethylcycl[3.2.2]azine and propionic anhydride; 1,4-dibenzoyl-5,6-dimethylcycl-[3.2.2]azine is prepared from 5,6-dimethylcycl[3.2.2]-azine and benzoic anhydride.

EXAMPLE VI

This example illustrates the preparation of a cycl-[3.2.2]azine bearing a hydrocarbyloxycarbonyl substituent [ROC(O)—].

A reaction vessel, equipped with reflux condenser, was charged with 1.17 parts of pyrrocoline, 1.42 parts of dimethyl acetylenedicarboxylate, 130 parts of toluene and 1 part of 5% palladium-on-charcoal catalyst. The vessel was flushed with nitrogen and the mixture was boiled under reflux for 12 hours in a nitrogen atmosphere. The mixture was cooled, the catalyst was separated by filtration, and the toluene was removed from the solution by evaporation. The residue was dissolved in benzene and the solution was chromatographed over neutral alumina. The eluate containing the first yellow band was concentrated to give 1.3 parts of 1,2-dicarbomethoxycycl[3.2.2]-azine (yellow prisms) which, after sublimation, melted at 91–92° C. The ultraviolet absorption spectrum of the compound showed maxima (log ε): 410 (3.97); 309 (3.90); 264 (4.27); and 247 mμ (4.38).

*Analysis.*—Calc'd for $C_{14}H_{11}NO_4$: C, 65.36; H, 4.31; N, 5.45. Found: C, 65.45; H, 4.31; N, 5.57.

The process of Example VI can be applied broadly to the preparation of cycl[3.2.2]azines having hydrocarbyloxycarbonyl groups. For example, 1,2-dicarbobutoxy-3-phenylcycl[3.2.2]azine is obtained from 2-phenylpyrrocoline and dibutyl acetylenedicarboxylate; 1,2-dicarbooctyloxy-3-methylcycl[3.2.2]azine is prepared from 2-methylpyrrocoline and dioctyl acetylenedicarboxylate. This broad class of compounds can be hydrolyzed to yield cycl[3.2.2]azines having carboxyl groups as illustrated in Example VII.

Cycl[3.2.2]azines having carbamyl [$H_2NC(O)$—] and N-substituted carbamyl groups are obtained by reacting compounds of the type obtained in Example VI with ammonia or substituted amines. For example, 1,2-dicarbamylcycl[3.2.2]azine is obtained from 1,2-dicarbomethoxycycl[3.2.2]azine and ammonia; 1,2-bis(phenylcarbamyl)-3-phenylcycl[3.2.2]azine is obtained from 1,2-dicarbomethoxy-3-phenylcycl[3.2.2]azine and aniline; 1,2-bis(N,-N-dioctylcarbamyl)cycl[3.2.2]azine is obtained from 1,2-dicarbomethoxycycl[3.2.2]azine; and 1,2-bis(N,N-dicyclohexylcarbamyl)-3-tolylcycl[3.2.2]azine is obtained from 1,2-dicarbomethoxy-3-tolylcycl[3.2.2]azine.

EXAMPLE VII

This example illustrates the preparation of a cycl-[3.2.2]azine having carboxyl substituents and the preparation of metal salts of the carboxyl-substituted azines.

A. *Preparation of a potassium salt*

A solution containing 1.29 parts of 1,2-dicarbomethoxycycl[3.2.2]azine and 16 parts of methanol was prepared. The solution was treated carefully with an excess of 10% methanolic potassium hydroxide solution. As hydrolysis proceeded a lemon-yellow solid separated from the solution. The mixture was allowed to stand at room temperature for 10 hours and the solid was separated by filtration. The yellow crystalline solid, which was the dipotassium salt of cycl[3.2.2]azine-1,2-dicarboxylic acid, was washed with methanol and dried.

B. *Preparation of a carboxylic acid*

The dipotassium salt, described above, was dissolved in hot water, the solution was heated, and 5% hydrochloric acid added slowly and with stirring. A precipitate formed which was separated by filtration and dried to give 1.1 parts of cycl[3.2.2]azine-1,2-dicarboxylic acid, a yellow solid, melting above 320° C. The compound is sparingly soluble in acetone and can be purified by crystallization from this solvent. The ultraviolet spectrum of the dicarboxylic acid showed maxima (log ε): 438 (4.00); 4.17 (3.95); 3.15 (3.95); 265 (4.25) and 250 mμ (4.36).

*Analysis.*—Calc'd for $C_{12}H_7NO_4$: C, 62.89; H, 3.08; N, 6.11. Found: C, 62.77; H, 3.21; N, 6.17.

The dibasic acid can be decarboxylated to form the parent cycl[3.2.2]azine, a process which provides another route to this important compound. To illustrate, a mixture of 0.229 part of cycl[3.2.2]azine-1,2-dicarboxylic acid and 0.04 part of a copper chromite catalyst in about 5 parts of quinoline was boiled under a stream of nitrogen until carbon dioxide was no longer evolved (4.5 hours). The mixture was cooled, filtered and poured into aqueous acid. The aqueous solution was extracted with ether and the ether extract was dried. The ether was removed by evaporation, leaving a yellow solid which was sublimed to obtain 0.125 part of cycl[3.2.2]azine, M.P. 64–65° C.

The dibasic acids can be used to prepare a wide range of salts by conventional and well known methods. For example, diammonium cycl[3.2.2]azine-1,2-dicarboxylate is obtained by neutralizing the acid with ammonium hydroxide; treatment with sodium hydroxide or barium hydroxide yields the sodium and barium salts. Other metal salts are obtained by reaction of the potassium or sodium salts of the dicarboxylic acids with appropriate inorganic metal salts, for example, copper sulfate, iron chloride, zinc chloride, and the like.

EXAMPLE VIII

This example illustrates the preparation of an anhydride from a cycl[3.2.2]azine having a plurality of carboxyl substituents.

A solution of 0.458 part of cycl[3.2.2]azine-1,2-dicarboxylic acid in 10.9 parts of acetic anhydride was heated to boiling under reflux conditions for 5 hours. The solvent was then removed under reduced pressure and the residue was sublimed. There was obtained 0.38 part of the anhydride of cycl[3.2.2]azine-1,2-dicarboxylic acid as yellow crystals, M.P. 240° C. In this compound the group —C(O)—O—C(O)— is bonded to the carbons in the 1,2-positions. The ultraviolet spectrum of the anhydride showed maxima (log $\epsilon$): 438 (3.81); 423 (3.84); 310 (3.96); 262 (4.29); 251 (4.34) and 235 m$\mu$ (4.22).

*Analysis.*—Calc'd for $C_{12}H_5NO_3$: C, 68.25; H, 2.39; N, 6.63. Found: C, 68.05; H, 2.67; N, 6.70.

EXAMPLE IX

This example illustrates the preparation of a cycl[3.2.2]azine having halogen substituents.

To a solution of 0.075 part of cycl[3.2.2]azine in 20 parts of methylene chloride, there was added with vigorous stirring 22.85 parts of a solution containing 0.01 part of bromine per 1.34 parts of methylene chloride. The reaction mixture was concentrated by removing volatile material under reduced pressure and the residue was then sublimed. The sublimate was recrystallized from cyclohexane to give 0.12 part of 1,4-dibromocycl[3.2.2]azine, a yellow crystalline solid, M.P. 121–122° C. Ultraviolet maxima (log $\epsilon$): 430 (3.76); 342 (3.73); 254 (4.33); and 240 m$\mu$ (4.24).

*Analysis.*—Calc'd for $C_{10}H_5NBr_2$: C, 40.17; H, 1.68. Found: C, 40.07; H, 1.69.

EXAMPLE X

This example illustrates a compound of the invention having a nitro substituent.

A solution of 0.16 part of powdered cupric nitrate trihydrate in 4.34 parts of acetic acid anhydride was prepared and 0.075 part of cycl[3.2.2]azine (Example I) was added to it. After standing 1.5 hours at room temperature, the solution was neutralized with aqueous sodium bicarbonate and extracted with methylene chloride. Evaporation of the methylene chloride extract left a solid residue which was sublimed to give 0.093 part of 1-nitrocycl[3.2.2]azine. The compound was recrystallized from a chloroform-carbon tetrachloride solution to yield orange needles which melted at 193.5–195° C.; ultraviolet absorption maxima (log $\epsilon$): 425 (4.18); 415 (4.14); 338 (3.82); 261 (4.12); and 227 m$\mu$ (4.45).

*Analysis.*—Calc'd for $C_{10}H_6N_2O_3$: C, 64.52; H, 3.22. Found: C, 64.37; H, 3.15.

It was stated earlier that the cycl[3.2.2]azines possess excellent thermal stability, as shown in Example III, wherein a typical cycl[3.2.2]azine was heated at 230° C. without showing signs of decomposition. The compounds are, therefore, useful as high temperature heat transfer agents where careful control of a high temperature is desired.

The compounds of the invention are generically useful as intermediates in the preparation of polymers and resins. The cycl[3.2.2]azines can be reacted alone or in combination with an aromatic hydrocarbon (e.g., naphthalene, anthracene) by the procedure described in Ellis, "The Chemistry of Synthetic Resins," vols. I and II, p. 264, Reinhold Publishing Corp. (1935), to obtain resins which are useful components of varnishes and lacquers. For example, a resin soluble in lacquer solvents is obtained by reacting cycl[3.2.2]azine or 2,3-diphenylcycl[3.2.2]azine with 30% formaldehyde in the presence of concentrated sulfuric acid. The various substituted cycl[3.2.2]azines described in the examples are useful in this field.

Cycl[3.2.2]azines having a plurality of functional substituents, e.g., carboxy, ester, acyl halide, amide and anhydride groups, are useful for preparing linear condensation polymers by reaction with other polyfunctional compounds such as glycols, diamines and diesters. Polymeric products of this class, which can be prepared by processes described in the literature (see, for example, U.S. 2,071,250) are useful as films and synthetic fibers. By way of illustration, the dicarboxylic acid of Example VII or the dicarbomethoxy compound of Example VI can be reacted with a diamine, e.g., hexamethylenediamine, to yield a long chain high molecular weight polyamide. Similarly, the diacid or the diester, mentioned above, can be reacted with a glycol, e.g., ethylene glycol, to yield a polyester which is useful in the fields of fibers and plastics.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows.

We claim:

1. Cycl[3.2.2]azine, said cycl[3.2.2]azine being of the formula

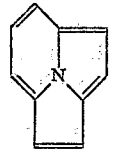

2. 2-phenylcycl[3.2.2]azine, said 2-phenylcycl[3.2.2]azine being of the formula

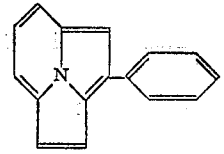

3. 2,3-diphenylcycl[3.2.2]azine, said 2,3-diphenylcycl[3.2.2]azine being of the formula

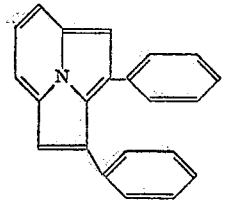

4. 1,4-diacetylcycl[3.2.2]azine, said 1,4-diacetylcycl[3.2.2]azine being of the formula

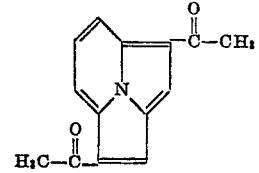

5. 1,4-diacetyl-2,3-diphenylcycl[3.2.2]azine, said 1,4-diacetyl-2,3-diphenylcycl[3.2.2]azine being of the formula

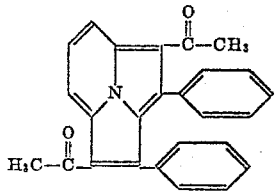

6. 1,2-dicarbomethoxycycl[3.2.2]azine, said 1,2-dicarbomethoxycycl[3.2.2]azine being of the formula

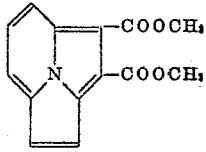

7. Cycl[3.2.2]azine-1,2-dicarboxylic acid, said cycl[3.2.2]azine-1,2-dicarboxylic acid being of the formula

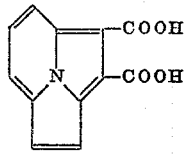

8. Anhydride of cycl[3.2.2]azine-1,2-dicarboxylic acid, said anhydride of cycl[3.2.2]azine-1,2-dicarboxylic acid being of the formula

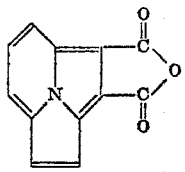

9. 1,4-dibromocycl[3.2.2]azine, said 1,4-dibromocycl[3.2.2]azine being of the formula

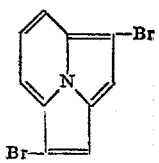

10. 1-nitrocycl[3.2.2]azine, said 1-nitrocycl[3.2.2]azine being of the formula

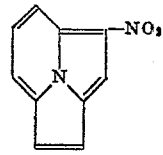

11. A cycl[3.2.2]azine of the formula:

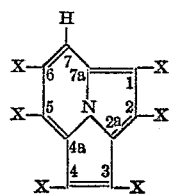

wherein the X's bonded to the carbons in the 1-, 2-, 3-, and 4-positions are members of the class consisting of hydrogen, hydrocarbon of up to 10 carbon atoms free of nonaromatic unsaturation, halogen,

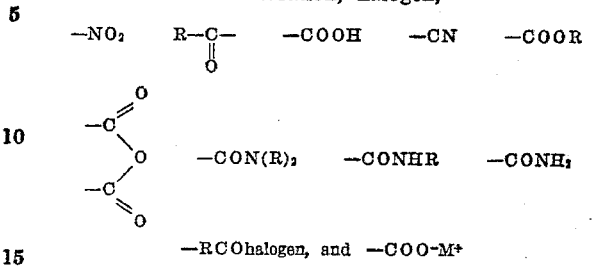

—RCOhalogen, and —COO-M+ wherein R is hydrocarbon of up to 8 carbon atoms and M is a cation selected from the class consisting of metals and the ammonium radical; and the X's bonded to carbons in the 5- and 6-positions are members of the class consisting of hydrogen, halogen and lower alkyl groups.

12. Process for preparing a cycl[3.2.2]azine which comprises reacting an alkali metal derivative of a 5-methylpyrrocoline of the formula

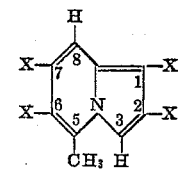

wherein the X's bonded to the carbons in the 1- and 2-positions are selected from the group consisting of hydrogen, hydrocarbon of up to 10 carbons free of nonaromatic unsaturation, halogen,

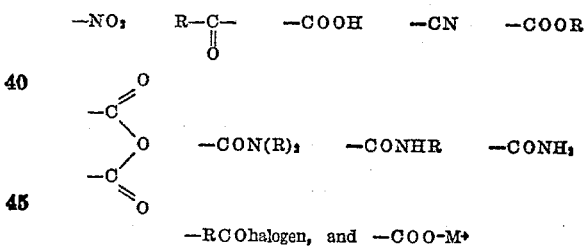

—RCOhalogen, and —COO-M+ in which R is hydrocarbon of up to 8 carbon atoms and M is a cation selected from the class consisting of metals and the ammonium radical; and the X's bonded to carbons in the 6- and 7-positions are members of the class consisting of hydrogen, halogen, and lower alkyl groups; with a carbonyl compound of the formula

wherein R' is a member of the class consisting of hydrogen and hydrocarbon of up to 12 carbon atoms, and Y is a member of the class consisting of —O(lower alkyl), and —N(lower alkyl)$_2$, and heating the resulting intermediate product with glacial acetic acid to effect ring closure.

No references cited.